US005615403A

United States Patent [19]
Bissett et al.

[11] Patent Number: 5,615,403
[45] Date of Patent: Mar. 25, 1997

[54] METHOD FOR EXECUTING I/O REQUEST BY I/O PROCESSOR AFTER RECEIVING TRAPPED MEMORY ADDRESS DIRECTED TO I/O DEVICE FROM ALL PROCESSORS CONCURRENTLY EXECUTING SAME PROGRAM

[75] Inventors: Thomas D. Bissett, Northborough; Richard D. Fiorentino, Carlisle; Robert M. Glorioso, Stow; Diane T. McCauley, Hopkinton; James D. McCollum, Whitinsville; Glenn A. Tremblay, Upton; Mario Troiani, Newton, all of Mass.

[73] Assignee: Marathon Technologies Corporation, Boxboro, Mass.

[21] Appl. No.: 537,985

[22] Filed: Oct. 2, 1995

Related U.S. Application Data

[63] Continuation of Ser. No. 159,783, Dec. 1, 1993, abandoned.
[51] Int. Cl.⁶ .................................................. G06F 13/00
[52] U.S. Cl. ...................... 395/881; 395/825; 395/826; 395/827; 395/840; 395/200.19; 395/182.1
[58] Field of Search ........................ 395/200.19, 821, 395/825, 826, 827, 840, 878, 881, 182.1

[56] References Cited

U.S. PATENT DOCUMENTS

| | | | |
|---|---|---|---|
| 4,270,168 | 5/1981 | Murphy et al. | 395/182.08 |
| 4,356,546 | 10/1982 | Whiteside et al. | 395/182.08 |
| 4,358,823 | 11/1982 | McDonald et al. | 395/182.09 |
| 4,449,182 | 5/1984 | Rubinson et al. | 395/250 |
| 4,531,185 | 7/1985 | Halpern et al. | 395/550 |
| 4,622,667 | 11/1986 | Yount | 395/182.09 |
| 4,634,110 | 1/1987 | Julich et al. | 395/182.09 |
| 4,695,945 | 9/1987 | Irwin | 364/200 |
| 4,812,968 | 3/1989 | Poole | 395/275 |
| 4,823,256 | 4/1989 | Bishop et al. | 395/182.08 |

(List continued on next page.)

FOREIGN PATENT DOCUMENTS

| | | |
|---|---|---|
| 0327083 | 8/1989 | European Pat. Off. |
| 0372580 | 6/1990 | European Pat. Off. |

OTHER PUBLICATIONS

Siewiorek et al., "Reliable Computer Systems Design and Evaluation", Digital Press 1992, pp. 618–622.
Williams, "New approach allows painless move to fault tolerance", Computer Design, May 1992.
IMP, Integrated Micro Products, XM–RISC Fault Tolerant Computer System, Oct. 1992.
PCT Written Opinion dated Sep. 13, 1995.
International Search Report dated May 3, 1995.
"Low Cost Device For Contention–Free Barrier Synchronization," IBM Technical Disclosure Bulletin, vol. 31, No. 11, Apr. 1989, Armonk, NY, pp. 382–389.

*Primary Examiner*—Thomas C. Lee
*Assistant Examiner*—Ki S. Kim
*Attorney, Agent, or Firm*—Fish & Richardson P.C.

[57] ABSTRACT

The effects of I/O race conditions caused by asynchrony between processors concurrently executing the same software and I/O devices are eliminated by executing an application program and a first associated operating system with firs processors, and executing an I/O processing program and a second associated operating system with an I/O processor. Memory requests from the application program or the first associated operating system are processed with the first processors, and memory requests from the application program to memory addresses associated with I/O devices are trapped and transmitted to the I/O processor. The I/O processor then performs the trapped memory requests with the I/O processing program after waiting for the identical request to be received from each of the first processors to eliminate the effects of race conditions caused by asynchrony between processors concurrently executing the application program or the first associated operating system and I/O devices. I/O requests may be trapped and performed by the I/O processor for the same purpose.

5 Claims, 9 Drawing Sheets

U.S. PATENT DOCUMENTS

| | | | |
|---|---|---|---|
| 4,907,228 | 3/1990 | Bruckert et al. | 371/68.3 |
| 4,910,663 | 3/1990 | Bailey | 395/183.1 |
| 4,916,704 | 4/1990 | Bruckert et al. | 371/68.3 |
| 4,920,481 | 4/1990 | Binkley et al. | 364/200 |
| 4,933,940 | 6/1990 | Walter et al. | 395/182.08 |
| 4,937,741 | 6/1990 | Harper et al. | 364/200 |
| 4,965,717 | 10/1990 | Cutts, Jr. et al. | 395/182.1 |
| 5,005,174 | 4/1991 | Bruckert et al. | 371/68.3 |
| 5,048,022 | 9/1991 | Bissett et al. | 371/40.1 |
| 5,062,042 | 10/1991 | Binkley et al. | 364/200 |
| 5,091,847 | 2/1992 | Herbermann | 395/182.01 |
| 5,095,423 | 3/1992 | Gramlich et al. | 395/600 |
| 5,099,485 | 3/1992 | Bruckert et al. | 371/68.3 |
| 5,146,589 | 9/1992 | Peet, Jr. et al. | 395/182.01 |
| 5,166,674 | 11/1992 | Baum et al. | 340/825.07 |
| 5,193,175 | 3/1993 | Cutts, Jr. et al. | 395/182.09 |
| 5,222,215 | 6/1993 | Chou et al. | 395/275 |
| 5,226,152 | 7/1993 | Klug et al. | 395/575 |
| 5,239,641 | 8/1993 | Horst | 395/550 |
| 5,249,187 | 9/1993 | Bruckert et al. | 371/68.1 |
| 5,251,312 | 10/1993 | Sodos | 395/425 |
| 5,255,367 | 10/1993 | Bruckert et al. | 395/200 |
| 5,261,092 | 11/1993 | McLaughlin et al. | 395/600 |
| 5,276,823 | 1/1994 | Cutts, Jr. et al. | 395/182.09 |
| 5,317,726 | 5/1994 | Horst | 395/182.1 |
| 5,327,553 | 7/1994 | Jewett et al. | 395/182.01 |
| 5,339,404 | 8/1994 | Vandling, III | 395/180 |
| 5,367,639 | 11/1994 | Sodos | 395/275 |

METHOD FOR EXECUTING I/O REQUEST BY I/O PROCESSOR AFTER RECEIVING TRAPPED MEMORY ADDRESS DIRECTED TO I/O DEVICE FROM ALL PROCESSORS CONCURRENTLY EXECUTING SAME PROGRAM

This is a continuation of application Ser. No. 08/159,783, filed Dec. 1, 1993, now abandoned.

BACKGROUND OF THE INVENTION

The invention relates to fault resilient and fault tolerant computing methods and apparatus.

Fault resilient computer systems can continue to function in the presence of hardware failures. These systems operate in either an availability mode or an integrity mode, but not both. A system is "available" when a hardware failure does not cause unacceptable delays in user access, and a system operating in an availability mode is configured to remain online, if possible, when faced with a hardware error. A system has data integrity when a hardware failure causes no data loss or corruption, and a system operating in an integrity mode is configured to avoid data loss or corruption, even if it must go offline to do so.

Fault tolerant systems stress both availability and integrity. A fault tolerant system remains available and retains data integrity when faced with a single hardware failure, and, under some circumstances, with multiple hardware failures.

Disaster tolerant systems go one step beyond fault tolerant systems and require that loss of a computing site due to a natural or man-made disaster will not interrupt system availability or corrupt or lose data.

Prior approaches to fault tolerance include software checkpoint/restart, triple modular redundancy, and pair and spare.

Checkpoint/restart systems employ two or more computing elements that operate asynchronously and may execute different applications. Each application periodically stores an image of the state of the computing element on which it is running (a checkpoint). When a fault in a computing element is detected, the checkpoint is used to restart the application on another computing element (or on the same computing element once the fault is corrected). To implement a checkpoint/restart system, each of the applications and/or the operating system to be run on the system must be modified to periodically store the image of the system. In addition, the system must be capable of "backtracking" (that is, undoing the effects of any operations that occurred subsequent to a checkpoint that is being restarted).

With triple modular redundancy, three computing elements run the same application and are operated in cycle-by-cycle lockstep. All of the computing elements are connected to a block of voting logic that compares the outputs (that is, the memory interfaces) of the three computing elements and, if all of the outputs are the same, continues with normal operation. If one of the outputs is different, the voting logic shuts down the computing element that has produced the differing output. The voting logic, which is located between the computing elements and memory, has a significant impact on system speed.

Pair and spare systems include two or more pairs of computing elements that run the same application and are operated in cycle-by-cycle lockstep. A controller monitors the outputs (that is, the memory interfaces) of each computing element in a pair. If the outputs differ, both computing elements in the pair are shut down.

SUMMARY OF THE INVENTION

According to the invention, a fault resilient and/or fault tolerant system is obtained through use of at least two computing elements ("CEs") that operate asynchronously in real time (that is, from cycle to cycle) and synchronously in so-called "meta time." The CEs are synchronized at meta times that occur often enough so that the applications running on the CEs do not diverge, but are allowed to run asynchronously between the meta times. For example, the CEs could be synchronized once each second and otherwise run asynchronously. Because the CEs are resynchronized at each meta time, the CEs are said to be operating in meta time lockstep.

In particular embodiments, meta times are defined as the times at which the CEs request I/O operations. In these embodiments, the CEs are synchronized after each I/O operation and run asynchronously between I/O operations. This approach is applicable to systems in which at least two asynchronous computing elements running identical applications always generate I/O requests in the same order. This approach can be further limited to resynchronization after only those I/O requests that modify the processing environment (that is, write requests).

Meta time synchronization according to the invention is achieved through use of a paired modular redundant architecture that is transparent to applications and operating system software. According to this architecture, each CE is paired with a controller, otherwise known as an I/O processor ("IOP"). The IOPs perform any I/O operations requested by or directed to the CEs, detect hardware faults, and synchronize the CEs with each other after each I/O operation. In systems in which I/O requests are not issued with sufficient frequency, the IOPs periodically synchronize the CEs in response to so-called "quantum interrupts" generated by inter-processor interconnect (IPI) modules connected to the CEs.

In another particular embodiment of the invention, rather than synchronizing the CEs based on each particular I/O operation, the CEs are synchronized based on a window of I/O operations. In this approach, a list of I/O operations is maintained for each CE and the CEs are synchronized whenever a common entry appears in all of the lists. This approach allows flexibility as to the order in which I/O requests are generated.

In yet another exemplary embodiment of the invention, the CEs are synchronized based either on signals that are periodically generated by the operating system or on hardware generated interrupts. For example, in the hardware interrupt approach, a processor of each CE is modified to generate an interrupt every N cycles and the CEs are synchronized in response to those interrupts.

Primary components of a paired modular redundant system include software, off-the-shelf IOPs, off-the-shelf CEs, and pairs of customized IPI modules that plug into expansion slots of the IOP and the CE and are interconnected by a cable. Redundant I/O devices can be connected to one or more of the CEs or IOPs to provide redundant I/O and offer features such as volume shadowing of key mass storage devices. A paired modular redundant system can accommodate any I/O device that is compatible with a processor used in implementing an IOP of the system.

The paired modular redundant architecture uses minimal custom software and hardware to enable at least two offthe-shelf computing elements to be combined into a fault resilient or tolerant system that runs industry standard operating systems, such as Windows NT, DOS, OS/2, or UNIX, and unmodified applications. Thus, the architecture can avoid both the high costs and inflexibility of the proprietary operating systems, applications, and processor designs used in the prior art.

Another advantage of the paired modular redundant architecture of the present invention is that it offers a certain degree of software fault tolerance. The majority of software errors are not algorithmic. Instead, most errors are caused by asynchrony between the computing element and I/O devices that results in I/O race conditions. By decoupling I/O requests from the computing elements, the paired modular redundant architecture should substantially reduce the number of so-called "Heisenbug" software errors that result from such asynchrony.

In one aspect, generally, the invention features forming a fault tolerant or fault resilient computer by using at least one controller to synchronize at least two computing elements that each have clocks operating asynchronously of the clocks of the other computing elements. One or more signals, designated as meta time signals, are selected from a set of signals produced by the computing elements. Thereafter, the computing elements are monitored to detect the production of selected signals by one of the computing elements. Once a selected signal is detected, the system waits for the production of selected signals by the other computing elements, and, upon receiving the selected signals, transmits equal time updates to each of the computing elements. The clocks of the computing elements are then updated based on the time updates.

Preferred embodiments of the invention include the features listed below. First, I/O requests are the selected signals. The I/O requests are processed to produce I/O responses that are transmitted with the time updates. In addition to, or instead of, I/O requests, quantum interrupts can be the selected signals. The computing elements count either executed instructions or the cycles of a clock such as the system clock, bus clock, or I/O clock, and generate quantum interrupts whenever a predefined number of instructions or cycles occurs. When both I/O requests and quantum interrupts are used as the selected signals, the computing elements count the number of instructions or cycles that occur without an I/O request. For example, a computing element could be programmed to generate a quantum interrupt whenever it processes for one hundred cycles without generating an I/O request.

In one embodiment, instructions are counted by loading a counter with a predetermined value, enabling the counter with an I/O request, decrementing the value of the counter, and signalling a quantum interrupt when the value of the counter reaches zero. In another approach, debugging features of the processor are used to generate the quantum interrupts.

For fault detection, the selected signals and accompanying data, if any, from each of the computing elements are compared. If they do not match, a signal is generated to indicate that a fault has occurred.

In some embodiments, the computing elements wait for time updates by pausing operation after producing the selected signals. The computing elements resume operation upon receipt of the time updates. In other embodiments, the computing elements continue operation after producing the selected signals.

To avoid problems that can be caused by asynchronous activities of the computing elements, the asynchronous activities are disabled. The functions of the asynchronous activities are then performed when a selected signal is produced. For example, normal memory refresh functions are disabled and, in their place, burst memory refreshes are performed each time that a selected signal, such as an I/O request or a quantum interrupt, is produced.

The invention also features a method of producing fault resilient or fault tolerant computers by designating a first processor as a computing element, designating a second processor as a controller, and connecting the computing element and the controller to produce a modular pair. Thereafter, at least two modular pairs are connected to produce a fault resilient or fault tolerant computer. The processors used for the computing elements need not be identical to each other, but preferably they all perform each instruction of their instruction sets in the same number of cycles as are taken by the other processors. Typically, industry standard processors are used in implementing the computing elements and the controllers. For disaster tolerance, at least one of the modular pairs can be located remotely from the other modular pairs. The controllers and computing elements are each able to run unmodified industry standard operating systems and applications. In addition, the controllers are able to run a first operating system while the computing elements simultaneously run a second operating system.

I/O fault resilience is obtained by connecting redundant I/O devices to at least two modular pairs and transmitting at least identical I/O write requests and data to the redundant I/O devices. While I/O read requests need only be transmitted to one of the I/O devices, identical I/O read requests may be transmitted to more than one of the I/O devices to verify data integrity. When redundant I/O devices are connected to three or more modular pairs, transmission of identical I/O requests allows identification of a faulty I/O device.

In another aspect, generally, the invention features isolating I/O requests from computing operations in a computer through use of I/O redirection. Typically, I/O devices are accessed either through low level I/O requests or by directly addressing the I/O devices. Low level I/O requests include requests to the system's basic input output system (e.g., BIOS), boot firmware requests, boot software requests, and requests to the system's physical device driver software. When a computing element issues a low level I/O request, the invention features using software to redirect the I/O requests to an I/O processor. When the computing element directly addresses the physical I/O devices, the invention features providing virtual I/O devices that simulate the interfaces of physical I/O devices. Directly addressed I/O requests are intercepted and provided to the virtual I/O devices. Periodically, the contents of the virtual I/O devices are transmitted to the I/O processor(s) as I/O requests. At the I/O processor(s), the transmitted contents of the virtual I/O devices are provided to the physical I/O devices. After the requested I/O operations are performed, the results of the operations, if any, are returned to the computing elements as responses to the I/O requests. Typically, the virtual I/O devices include a virtual keyboard and a virtual display.

The invention also features detecting and diagnosing faults in a computer system that includes at least two controllers that are connected to each other and to at least two computing elements, and at least two computing elements that are each connected to at least two of the controllers. Each computing element produces data and generates a value, such as an error checking code, that relates to the data. Each computing element then transmits the data, along with its corresponding value, to the at least two controllers to which it is connected. When the controllers receive the data and associated values, they transmit the values to the other controllers. Each controller then performs computations on the values corresponding to each computing element and the values corresponding to each controller. If the results of the computations on the values corresponding to each controller are equal, and the results of the computations on the values corresponding to each computing element are equal, then no fault exists. Otherwise, a fault exists. In some instances, the computation may be a simple bit by bit comparison.

When a fault exists, fault diagnosis is attempted by comparing, for each one of the computing element, all of the values corresponding to the one computing element. If the values corresponding to each computing element match for each computing element, but mismatch for different computing elements, then one of the computing elements is faulty. If the values corresponding to only one of the computing elements mismatch, then a path to that computing element is faulty. If the values corresponding to multiple computing elements mismatch, then the controller that is connected to the mismatching computing elements is faulty. Once identified, the faulty element is disabled.

A system according to the invention can restore itself to full capability after a faulty element (that is, a CE, an IOP, a storage device, etc.) is repaired. The system does so by transferring the state of an active element to the repaired element and, thereafter, reenabling the repaired element. Inactive or repaired processors are activated by transferring the operational state of an active processor or processors to the inactive processor through a controller. When the inactive processor is a computing element, the operational state of an active computing element (or elements) is transferred through a controller. When the inactive processor is a controller, the operating state of an active controller is directly transferred. The transfer can occur either when system operation is paused or as a background process.

This recovery capability can also be used to provide on-line upgrades of hardware, software, or both by causing a processor of the system to fail by, for example, turning it off. The upgrade is then performed by either replacing or modifying the disabled processor. The upgraded processor is then turned on and reactivated as discussed above.

The invention also features a single controller, dual computing element system in which a controller is connected to two computing elements. In this computer system, I/O operations by the computing elements are intercepted and redirected to the controller. Typically, the controller and the two computing elements each include an industry standard motherboard, and are each able to run unmodified industry standard operating systems and applications. In addition, the controller is able to run a first operating system while the computing elements simultaneously run a second operating system.

The single controller system can be expanded to include a second controller connected both to the first controller and to the two computing elements. For purposes of providing limited disaster resilience, the first controller and one of the computing elements can be placed in a location remote from the second controller and the other computing element, and can be connected to the second controller and the other computing element by a communications link.

For improved availability and performance, the dual controller, dual computing element system can be connected to an identical second system. The two systems then run a distributed computing environment in which one of the systems runs a first portion of a first application and the other system runs either a second application or a second portion of the first application.

In another embodiment, the invention features a computer system that includes three controllers connected to each other and three computing elements that are each connected to different pairs of the three controllers. This system, like the other systems, also features intercepting I/O operations by the computing elements and redirecting them to the controllers for processing. For disaster resilience, the first controller and one of the computing elements are placed in a location remote from the remaining controllers and computing elements, or each controller/computing element pair is placed in a different location.

A disaster tolerant system is created by connecting at least two of the three controller systems described above. The three controller systems are placed in remote locations and connected by a communications link.

DESCRIPTION OF THE PREFERRED EMBODIMENTS

Figure 1:
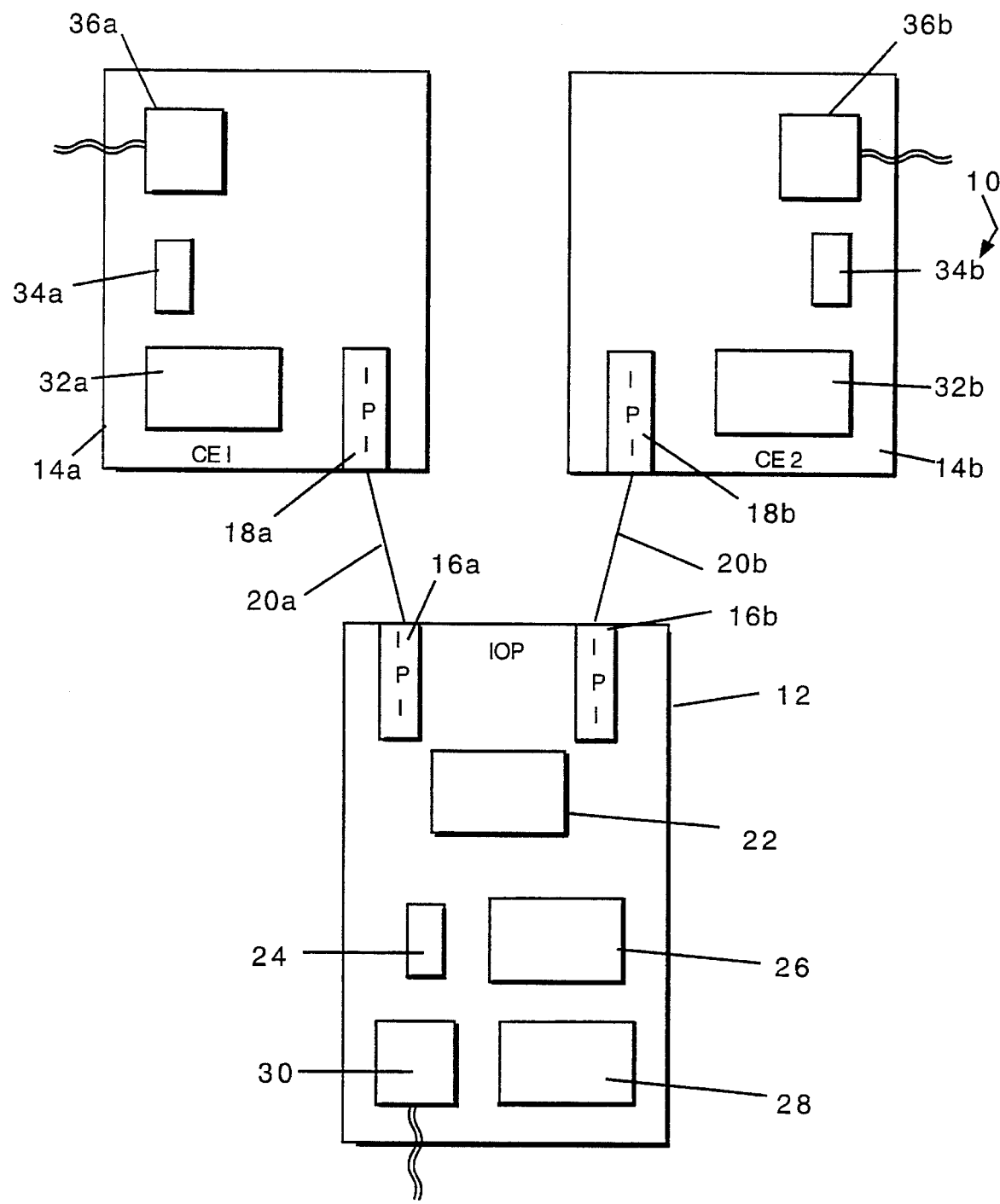
FIG. 1 is a block diagram of a partially fault resilient system.

As illustrated in FIG. 1, a fault resilient system 10 includes an I/O processor ("IOP") 12 and two computing elements ("CEs") 14a, 14b (collectively referred to as CEs 14). Because system 10 includes only a single IOP 12 and therefore cannot recover from a failure in IOP 12, system 10 is not entirely fault resilient.

IOP 12 includes two inter-processor interconnect ("IPI") modules 16a, 16b that are connected, respectively, to corresponding IPI modules 18a, 18b of CEs 14 by cables 20a, 20b. IOP 12 also includes a processor 22, a memory system 24, two hard disk drives 26, 28, and a power supply 30. Similarly, each CE 14 includes a processor 32, a memory system 34, and a power supply 36. Separate power supplies 36 are used to ensure fault resilience in the event of a power supply failure. Processors 32a, 32b are "identical" to each other in that, for every instruction, the number of cycles required for processor 32a to perform an instruction is identical to the number of cycles required for processor 32b to perform the same instruction. In the illustrated embodiment, system 10 has been implemented using standard Intel 486 based motherboards for processors 22, 32 and four megabytes of memory for each of memory systems 24, 34.

IOP 12 and CEs 14 of system 10 run unmodified operating system and applications software, with hard drive 26 being used as the boot disk for the IOP and hard drive 28 being used as the boot disk for CEs 14. In truly fault resilient or fault tolerant systems that include at least two IOPs, each hard drive would also be duplicated.

In the illustrated embodiment, the operating system for IOP 12 and CEs 14 is DOS. However, other operating systems can also be used. Moreover, IOP 12 can run a different operating system from the one run by CEs 14. For example, IOP 12 could run Unix while CEs 14 run DOS. This approach is advantageous because it allows CEs 14 to access peripherals from operating systems that do not support the peripherals. For example, if CEs 14 were running an operating system that did not support CD-ROM drives, and IOP 12 were running one that did, CEs 14 could access the CD-ROM drive by issuing I/O requests identical to those used to, say, access a hard drive. IOP 12 would then handle the translation of the I/O request to one suitable for accessing the CD-ROM drive.

Figure 2:
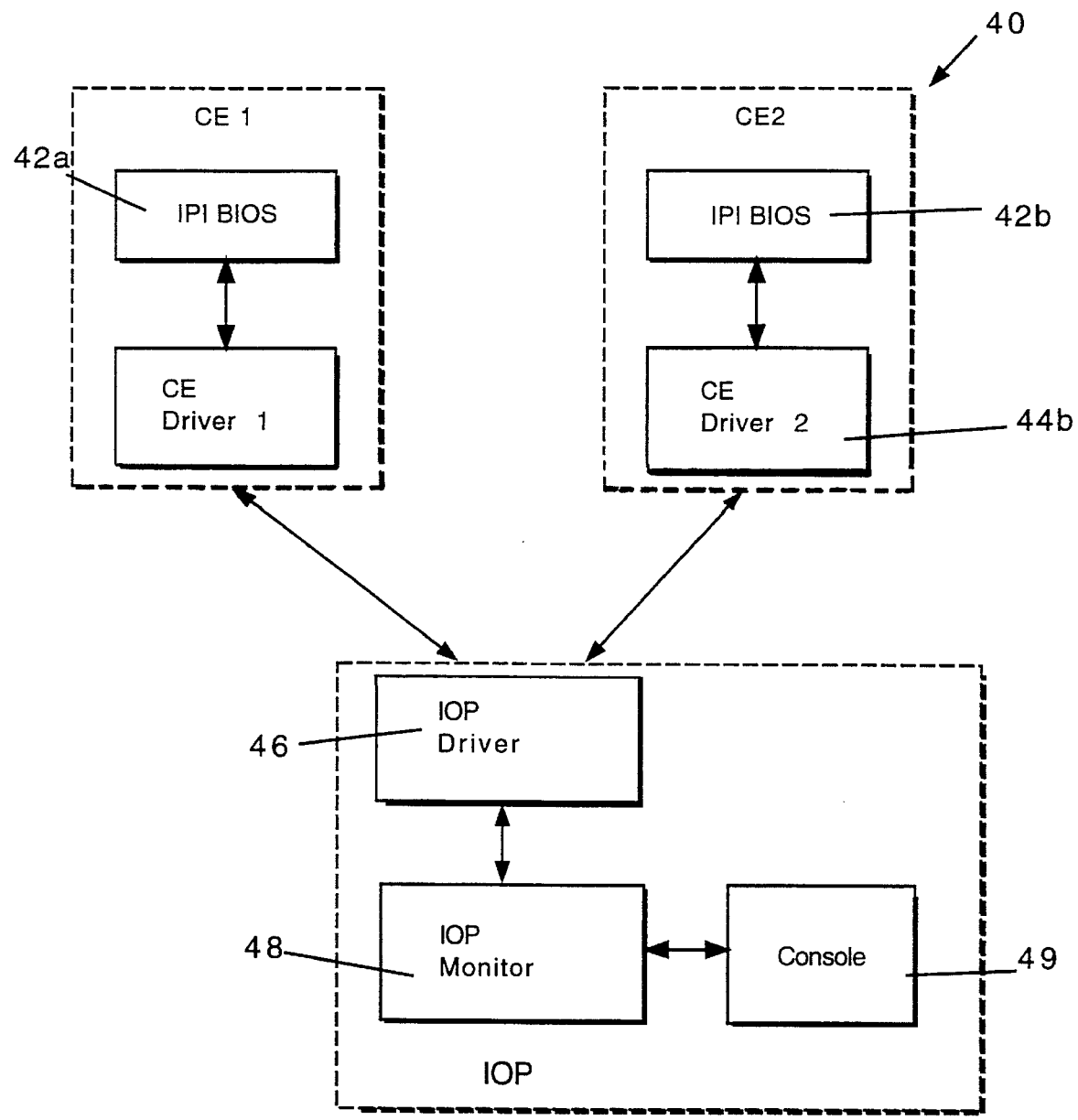
FIG. 2 is a block diagram of system software of the system of FIG. 1.

Referring also to FIG. 2, system 10 includes specialized system software 40 that controls the booting and synchronization of CEs 14, disables local time in CEs 14, redirects all I/O requests from CEs 14 to IOP 12 for execution, and returns the results of the I/O requests, if any, from IOP 12 to CEs 14.

System software 40 includes two sets of IPI BIOS 42 that are ROM-based and are each located in the IPI module 18 of a CE 14. IPI BIOS 42 are used in bootup and synchronization activities. When a CE 14 is booted, IPI BIOS 42 replaces the I/O interrupt addresses in the system BIOS interrupt table with addresses that are controlled by CE Drivers 44. The interrupt addresses that are replaced include those corresponding to video services, fixed disk services, serial communications services, keyboard services, and time of day services.

IPI BIOS 42 also disables normal memory refreshing to ensure that memory refreshing, which affects the number of cycles during which a CE 14 is actually processing, is controlled by system software 40. Memory refreshing is required to maintain memory integrity. In known refreshing methods, memory is refreshed periodically, with one block of memory being refreshed at the end of each refresh period. The duration of the refresh period is selected so that the entire memory is refreshed within the memory's refresh limit. Thus, for example, if a memory has 256 blocks and an 8 ms refresh limit, then the refresh period is 31.25 µs (8 ms/256).

In the described embodiment, IPI BIOS 42 disables memory refreshing by placing a counter used in the Intel 486 motherboard to control memory refreshing in a mode that requires a gate input to the counter to change in order to increment. Because the gate input is typically connected to the power supply, the gate input never changes and the counter is effectively disabled.

Two CE Drivers 44 of system software 40 handle memory refreshing by burst refreshing multiple blocks of memory each time that an I/O request or quantum interrupt is generated. CE Drivers 44 are stored on CE boot disk 28 and are run by CEs 14. In addition to performing burst memory refreshes, CE Drivers 44 intercept I/O requests to the system BIOS and redirects them through IPI modules 18 to IOP 12 for execution. CE Drivers 44 also respond to interrupt requests from IPI modules 18, disable the system clock, and, based on information supplied by IOP Monitor 48, control the time of day of CEs 14.

An IOP Driver 46 that is located on IOP boot disk 26 and is run by IOP 12 handles I/O requests from CEs 14 by redirecting them to an IOP Monitor 48 for processing and transmitting the results from IOP Monitor 48 to CEs 14. IOP Driver 46 communicates with CE drivers 44 using a packet protocol.

IOP Monitor 48 is located on IOP boot disk 26 and is run by IOP 12. IOP Monitor 48 controls system 10 and performs the actual I/O requests to produce the results that are transmitted by IOP Driver 46 to CEs 14.

System software 40 also includes console software 49 that runs on IOP 12 and provides for user control of system 10. Using console software 49, a user can reset, boot, or synchronize a CE 14. The user can also set one or both of CEs 14 to automatically boot (autoboot) and/or automatically synchronize (autosync) after being reset or upon startup. The ability to control each CE 14 is useful both during normal operation and for test purposes. Using console software 49, the user can also place system 10 into either an integrity mode in which IOP Monitor 48 shuts down both CEs 14 when faced with a miscompare error, a first availability mode in which IOP Monitor 48 disables CE 14a when faced with a miscompare error, or a second availability mode in which IOP Monitor 48 disables CE 14b when faced with a miscompare error. Finally, console software 49 allows the user to request the status of system 10. In an alternative embodiment, console software 49 could be implemented using a separate processor that communicates with IOP 12.

Each CE 14 runs a copy of the same application and the same operating system as that run by the other CE 14. Moreover, the contents of memory systems 34a and 34b are the same, and the operating context of CEs 14 are the same at each synchronization time. Thus, IOP Monitor 48 should receive identical sequences of I/O requests from CEs 14.

Figure 3:
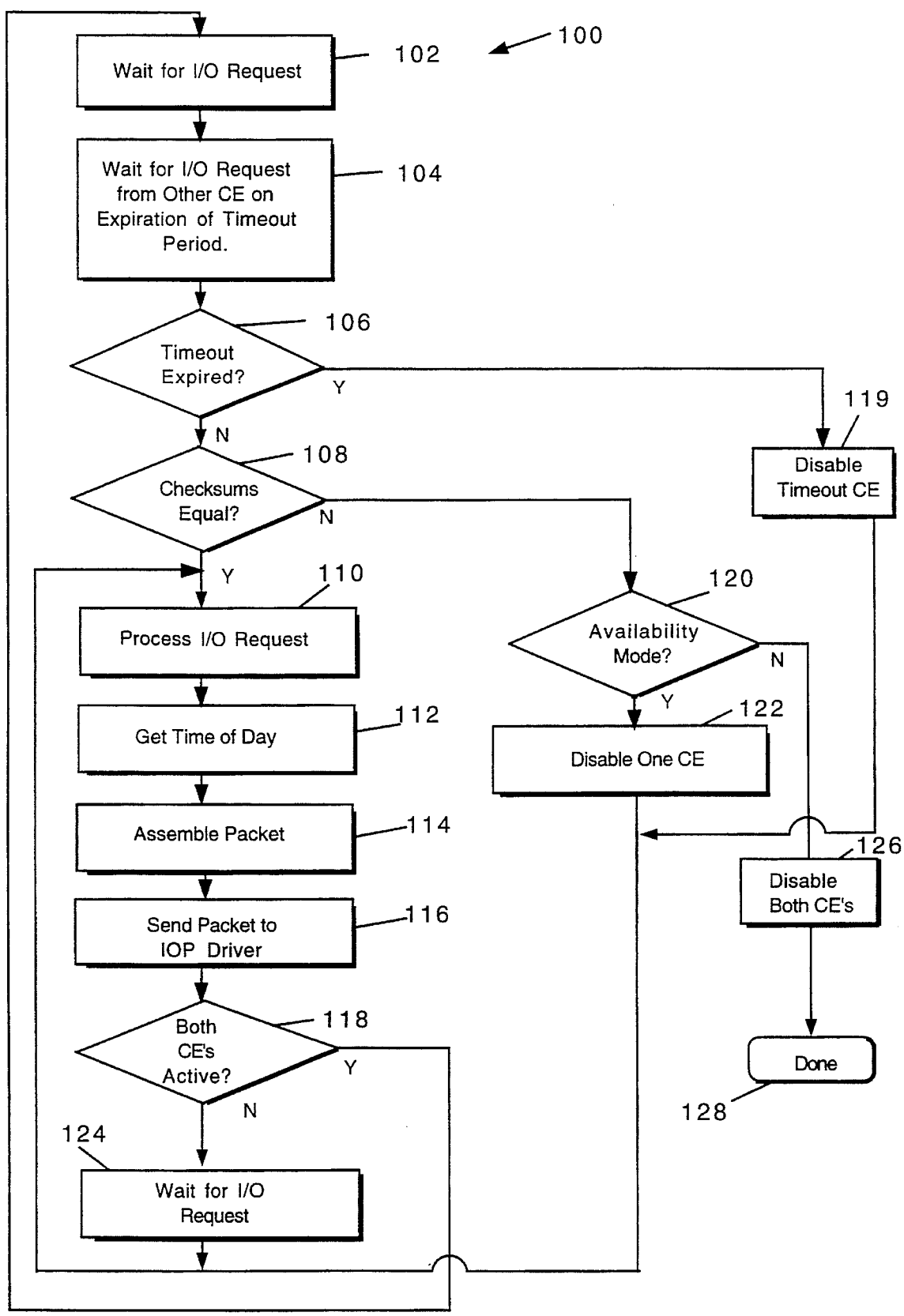
FIG. 3 is a flowchart of a procedure used by an IOP Monitor of the system software of FIG. 2.

As shown in FIG. 3, IOP Monitor 48 processes and monitors I/O requests according to a procedure 100. Initially, IOP Monitor 48 waits for an I/O request from one of CEs 14 (step 102). Upon receiving an I/O request packet from, for example, CE 14b, IOP Monitor 48 waits for either an I/O request from CE 14a or for the expiration of a timeout period (step 104). Because system 10 uses the DOS operating system, which halts execution of an application while an I/O request is being processed, IOP Monitor 48 is guaranteed not to receive an I/O request from CE 14b while waiting (step 104) for the I/O request from the CE 14a.

Next, IOP Monitor 48 checks to determine whether the timeout period has expired (step 106). If not (that is, an I/O request packet from CE 14a has arrived), IOP Monitor 48 compares the checksums of the packets (step 108), and, if the checksums are equal, processes the I/O request (step 110). After processing the I/O request, IOP Monitor 48 issues a request to the system BIOS of IOP 12 for the current time of day (step 112).

After receiving the time of day, IOP Monitor 48 assembles an IPI packet that includes the time of day and the results, if any, of the I/O request (step 114) and sends the IPI packet to IOP Driver 46 (step 116) for transmission to CEs 14. When CEs 14 receive the IPI packet, they use the transmitted time of day to update their local clocks which, as already noted, are otherwise disabled.

As required by DOS, execution in CEs 14 is suspended until IOP Monitor 48 returns the results of the I/O request through IOP Driver 46. Because, before execution is resumed, the times of day of both CEs 14 are updated to a common value (the transmitted time of day from the IPI packet), the CEs 14 are kept in time synchronization with the transmitted time of day being designated the meta time. If a multitasking operating system were employed, execution in CEs 14 would not be suspended while IOP Monitor 48 performed the I/O request. Instead, processing in CEs 14 would be suspended only until receipt of an acknowledgement indicating that IOP Monitor 48 has begun processing the I/O request (step 110). The acknowledgement would include the time of day and would be used by CEs 14 to update the local clocks.

After sending the IPI packet to IOP Driver 46, IOP Monitor 48 verifies that both of CEs 14 are online (step 118), and, if so, waits for another I/O request from one of CEs 14 (step 102).

If the timeout period has expired (step 106), IOP Monitor 48 disables the CE 14 that failed to respond (step 119) and processes the I/O request (step 110).

If there is a miscompare between the checksums of the packets from CEs 14 (step 108), IOP Monitor 48 checks to see if system 10 is operating in an availability mode or an integrity mode (step 120).

If system 10 is operating in an availability mode, IOP Monitor 48 disables the appropriate CE 14 based on the selected availability mode (step 122), and processes the I/O request (step 110). Thereafter, when IOP Monitor 48 checks whether both CEs 14 are online (step 118), and assuming that the disabled CE 14 has not been repaired and reactivated, IOP Monitor 48 then waits for an I/O request from the online CE 14 (step 124). Because system 10 is no longer fault resilient, when an I/O request is received, IOP Monitor 48 immediately processes the I/O request (step 110).

If system 10 is operating in an integrity mode when a miscompare is detected, IOP Monitor 48 disables both CEs 14 (step 126) and stops processing (step 128).

Referring again to FIGS. 1 and 2, when the application or the operating system of, for example, CE 14a makes a non-I/O call to the system BIOS, the system BIOS executes the request and returns the results to the application without invoking system software 40. However, if the application or the operating system makes an I/O BIOS call, CE Driver 44a intercepts the I/O request. After intercepting the I/O request, CE Driver 44a packages the I/O request into an IPI packet and transmits the IPI packet to IOP 12.

When IPI module 16a of IOP 12 detects transmission of an IPI packet from CE 14a, IPI module 16a generates an interrupt to IOP Driver 16. IOP Driver 46 then reads the IPI packet.

As discussed above, IOP Monitor 48 responds to the IPI packet from CE 14a according to procedure 100. As also discussed, assuming that there are no hardware faults, IOP Driver 46 eventually transmits an IPI packet that contains the results of the I/O request and the time of day to CEs 14.

IPI modules 18 of CEs 14 receive the IPI packet from IOP 12. CE Drivers 44 unpack the IPI packet, update the time of day of CEs 14, and return control of CEs 14 to the application or the operating system running on CEs 14.

If no I/O requests are issued within a given time interval, the IPI module 18 of a CE 14 generates a so-called quantum interrupt that invokes the CE Driver 44 of the CE 14. In response, the CE Driver 44 creates a quantum interrupt IPI packet and transmits it to IOP 12. IOP Monitor 48 treats the quantum interrupt IPI packet as an IPI packet without an I/O request. Thus, IOP Monitor 48 detects the incoming quantum interrupt IPI packet (step 102 of FIG. 3) and, if a matching quantum interrupt IPI packet is received from the other CE 14 (steps 104, 106, and 108 of FIG. 3), issues a request to the system BIOS of IOP 12 for the current time of day (step 112 of FIG. 3). IOP Monitor 48 then packages the current time of day into a quantum response IPI packet (step 114 of FIG. 3) that IOP Driver 46 then sends to CEs 14 (step 116 of FIG. 3). CE Drivers 44 respond to the quantum response IPI packet by updating the time of day and returning control of CEs 14 to the application or the operating system running on CEs 14.

If IOP Monitor 48 does not receive a quantum interrupt IPI package from the other CE 14 within a predefined timeout period (step 106 of FIG. 3), IOP Monitor 48 responds by disabling the non-responding CE 14.

As shown in FIG. 1, IPI modules 16, 18 and cables 20 provide all of the hardware necessary to produce a fault resilient system from the standard Intel 486 based motherboards used to implement processors 22, 32. An IPI module 16 and an IPI module 18, which are implemented using identical boards, each perform similar functions.

Figure 4:
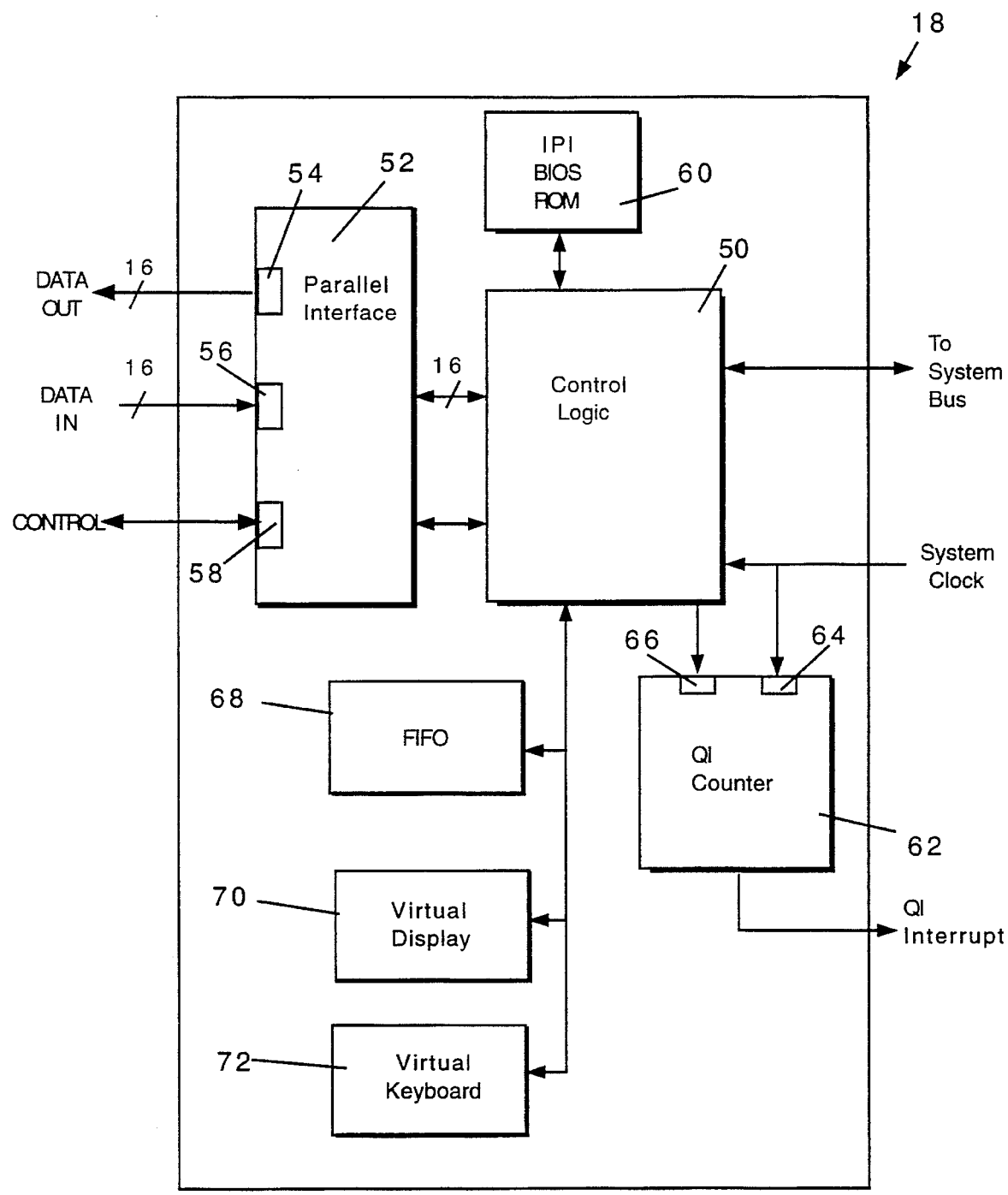
FIG. 4 is a block diagram of an IPI module of the system of FIG. 1.

As illustrated in FIG. 4, an IPI module 18 includes a control logic 50 that communicates I/O requests and responses between the system bus of a processor 32 of a CE 14 and a parallel interface 52 of IPI module 18. Parallel interface 52, in turn, communicates with the parallel interface of an IPI module 16 through a cable 20. Parallel interface 52 includes a sixteen bit data output port 54, a sixteen bit data input port 56, and a control port 58. Cable 20 is configured so that data output port 54 is connected to the data input port of the IPI module 16, data input port 56 is connected to the data output port of the IPI module 16, and control port 58 is connected to the control port of the IPI module 16. Control port 58 implements a handshaking protocol between IPI module 18 and the IPI module 16.

Control logic 50 is also connected to an IPI BIOS ROM 60. At startup, control logic 50 transfers IPI BIOS 42 (FIG. 2), the contents of IPI BIOS ROM 60, to processor 32 through the system bus of processor 32.

A QI counter 62, also located on IPI module 18, generates quantum interrupts as discussed above. QI counter 62 includes a clock input 64 that is connected to the system clock of processor 32 and a gate input 66 that is connected to control logic 50. Gate input 66 is used to activate and reset the counter value of QI counter 62. When activated, QI counter 62 decrements the counter value by one during each cycle of the system clock of processor 32. When the counter value reaches zero, QI counter 62 generates a quantum interrupt that, as discussed above, activates CE Driver 44 (FIG. 2).

CE Driver 44 deactivates QI counter 62 at the beginning of each I/O transaction. CE Driver 44 deactivates QI counter 62 by requesting an I/O write at a first address, known as the QI deactivation address. Control logic 50 detects the I/O write request and deactivates QI counter 62 through gate input 66. Because this particular I/O write is for control purposes only, control logic 50 does not pass the I/O write to parallel interface 52. At the conclusion of each I/O transaction, CE Driver 44 resets and activates QI counter 62 by requesting an I/O write to a second address, known as the QI activation address. Control logic 50 responds by resetting and activating QI counter 62.

In an alternative approach, quantum interrupts are generated through use of debugging or other features available in processor 32. Some commonly available processors include debugging or trap instructions that trap errors by transferring control of the processor to a designated program after the completion of a selected number of instructions following the trap instruction. In this approach, each time that CE Driver 44 returns control of processor 32 to the application or operating system, CE Driver 44 issues a trap instruction to indicate that control of processor 32 should be given to CE Driver 44 upon completion of, for example, 300 instructions. After processor 32 completes the indicated 300 instructions, the trap instruction causes control of processor 32 to be returned to CE Driver 44. In the event that an I/O request activates CE Driver 44 prior to completion of the indicated number of instructions, CE Driver 44 issues an instruction that cancels the trap instruction.

IPI Module 18 is also used in activating an offline CE 14. As discussed below, before an offline CE 14 is activated, the contents of the memory system 34 of the active CE 14 are copied into the memory system 34 of the offline CE 14. To minimize the effects of this copying on the active CE 14, the processor 32 of the active CE 14 is permitted to continue processing and the memory is copied only during cycles in which the system bus of the processor 32 of the active CE 14 is not in use.

To enable processor 32 to continue processing while the memory is being copied, IPI module 18 accounts for memory writes by the processor 32 to addresses that have already been copied to the offline CE 14. To do so, control logic 50 monitors the system bus and, when the processor 32 writes to a memory address that has already been copied, stores the address in a FIFO 68. When the memory transfer is complete, or when FIFO 68 is full, the contents of memory locations associated with the memory addresses stored in FIFO 68 are copied to the offline CE 14 and FIFO 68 is emptied. In other approaches, FIFO 68 is modified to store both memory addresses and the contents of memory locations associated with the addresses, or to store the block addresses of memory blocks to which memory addresses being written belong.

IPI module 18 also handles non-BIOS I/O requests. In some computer systems, the BIOS is too slow to effectively perform I/O operations such as video display. As a result, some less structured or less disciplined operating systems, such as DOS or UNIX, allow applications to circumvent the BIOS and make non-BIOS I/O requests by directly reading from or writing to the addresses associated with I/O devices. These non-BIOS I/O requests, which cannot be intercepted by changing the system interrupt table, as is done in connection with, for example, I/O disk reads and writes, are problematic for a system in which synchronization requires tight control of the I/O interface.

To remedy this problem, and to assure that even non-BIOS I/O requests can be isolated and managed by IOP 12, IPI module 18 includes virtual I/O devices that mimic the hardware interfaces of physical I/O devices. These virtual I/O devices include a virtual display 70 and a virtual keyboard 72. As needed, other virtual I/O devices such as a virtual mouse or virtual serial and parallel ports could also be used.

In practice, control logic 50 monitors the system bus for read or write operations directed to addresses associated with non-BIOS I/O requests to system I/O devices. When control logic 50 detects such an operation, control logic 50 stores the information necessary to reconstruct the operation in the appropriate virtual device. Thus, for example, when control logic 50 detects a write operation directed to an address associated with the display, control logic 50 stores the information necessary to reconstruct the operation in virtual display 70. Each time that a BIOS I/O request or a quantum interrupt occurs, CE Driver 44 scans the virtual I/O devices and, if the virtual devices are not empty, assembles the information stored in the virtual devices into an IPI packet and transmits the IPI packet to IOP 12. IOP 12 treats the packet like a BIOS I/O request using procedure 100 discussed above. When control logic 50 detects a read addressed to a virtual I/O device, control logic 50 assembles the read request into an IPI packet for handling by IOP 12. IOP 12 treats the IPI packet like a standard BIOS I/O request.

Figure 5:
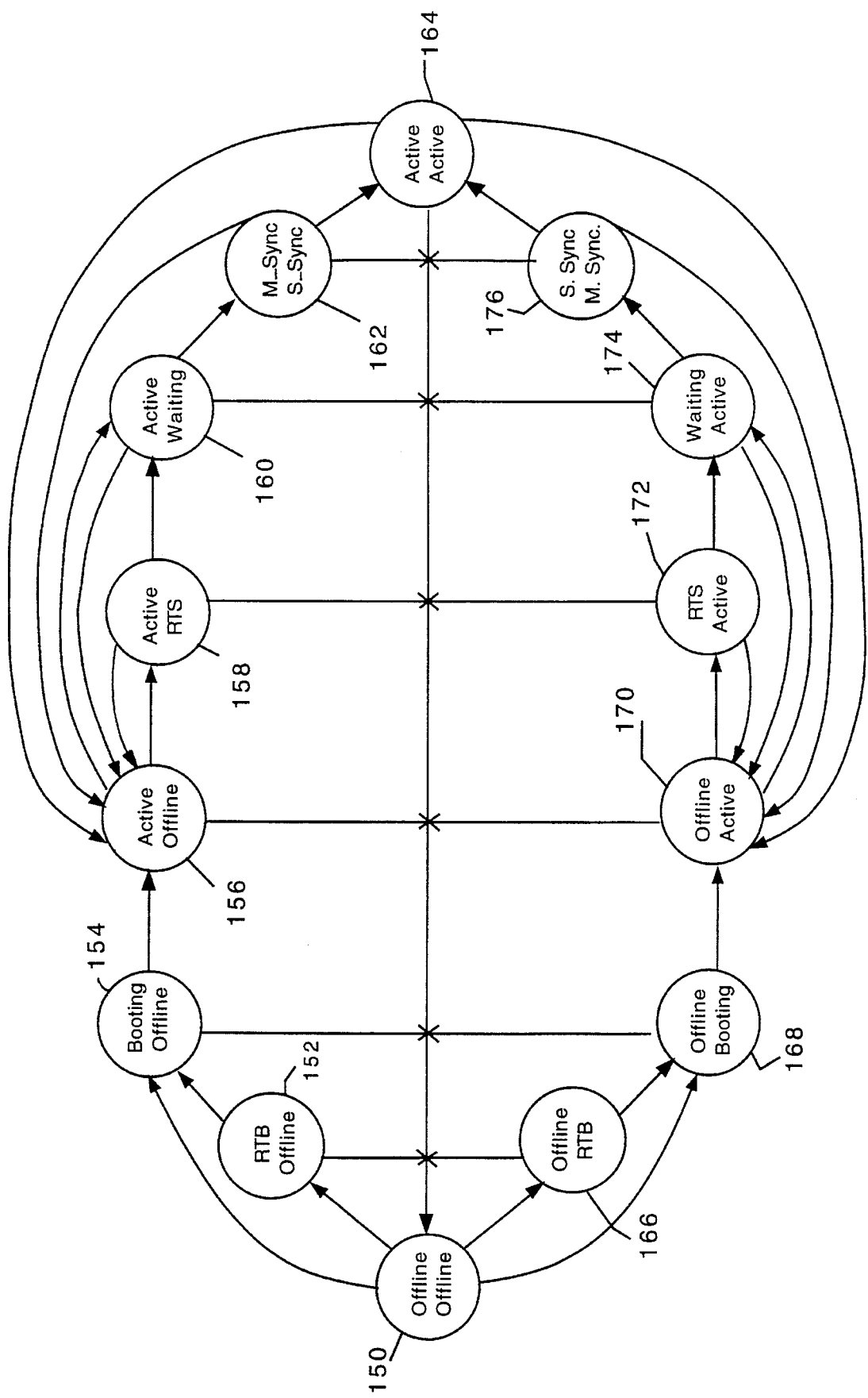
FIG. 5 is a state transition table for the system of FIG. 1.

Referring to FIG. 5, each CE 14 always operates in one of eight states and, because there are only a limited number of permissible state combinations, system 10 always operates in one of fourteen states. The major CE operating states are OFFLINE, RTB (ready to boot), BOOTING, ACTIVE, RTS (ready to sync), WAITING, M_SYNC, (synchronizing as master), and S_SYNC (synchronizing as slave). IOP Monitor 48 changes the operating states of CEs 14 based on the state of system 10 and user commands from console software 49. Through console software 49, a user can reset a CE 14 at any time. Whenever the user resets a CE 14, or a fault occurs in the CE 14, IOP Monitor 48 changes the state of the CE 14 to OFFLINE.

At startup, system 10 is operating with both CEs 14 OFFLINE (state 150). System 10 operates in the upper states of FIG. 5 (states 152–162) when CE 14a becomes operational before CE 14b and in the lower states (states 166–176) when CE 14b is the first to become operational. If CEs 14 become operational simultaneously, the first operational CE 14 to be recognized by IOP Monitor 48 is treated as the first to become operational.

When a CE 14 indicates that it is ready to boot by issuing a boot request, the state of the CE 14 changes to RTB if the CE 14 is not set to autoboot or to BOOTING if the CE 14 is set to autoboot. For example, if CE 14a issues a boot request when both CEs 14 are OFFLINE, and CE 14a is not set to autoboot, then the state of CE 14a changes to RTB (state 152). Thereafter, IOP Monitor 48 waits for the user, through console software 49, to boot CE 14a. When the user boots CE 14a, the state of CE 14a changes to BOOTING (state 154). If the user resets CE 14a, the state of CE 14a changes to OFFLINE (state 150).

If both CEs 14 are OFFLINE when CE 14a issues a boot request, and CE 14a is set to autoboot, the state of CE 14a changes to BOOTING (state 154). If CE 14a boots successfully, the state of CE 14a changes to ACTIVE (state 156).

When CE 14a is ACTIVE, and CE 14b issues a boot request, or if CE 14b had issued a boot request while the state of CE 14a was transitioning from OFFLINE to ACTIVE (states 152–156), the state of CE 14b changes to RTS (state 158) if CE 14b is set to autosync and otherwise to WAITING (state 160). If the state of CE 14b changes to RTS (state 158), IOP Monitor waits for the user to issue a synchronize command to CE 14b. When the user issues such a command, the state of CE 14b changes to WAITING (state 160).

Once CE 14b is WAITING, IOP Monitor 48 copies the contents of memory system 34a of CE 14a into memory system 34b of CE 14b. Once the memory transfer is complete, IOP Monitor 48 waits for CE 14a to transmit a quantum interrupt or I/O request IPI packet. Upon receipt of such a packet, IOP Monitor 48 changes the state of CE 14a to M_SYNC and the state of CE 14b to S_SYNC (state 162), and synchronizes the CEs 14. This synchronization includes responding to any memory changes that occurred while IOP Monitor 48 was waiting for CE 14a to transmit a quantum interrupt or I/O request IPI packet. Upon completion of the synchronization, the states of the CEs 14 both change to ACTIVE (state 164) and system 10 is deemed to be fully operational.

In an alternative implementation, IOP Monitor 48 does not wait for memory transfer to complete before changing the state of CE 14a to M_SYNC and the state of CE 14b to S_SYNC (state 162). Instead, IOP Monitor 48 makes this state change upon receipt of an IPI packet from CE 14a and performs the memory transfer as part of the synchronization process.

Similar state transitions occur when CE 14b is the first CE 14 to issue a boot request. Thus, assuming that CE 14b is not set to autoboot, CE 14b transitions from OFFLINE (state 150) to RTC (state 166) to BOOTING (state 168) to ACTIVE (state 170). Similarly, once CE 14b is ACTIVE, and assuming that CE 14a is not set to autosync, CE 14a transitions from OFFLINE (state 170) to RTS (state 172) to WAITING (state 174) to S_SYNC (state 176) to ACTIVE (state 164).

Figure 6:
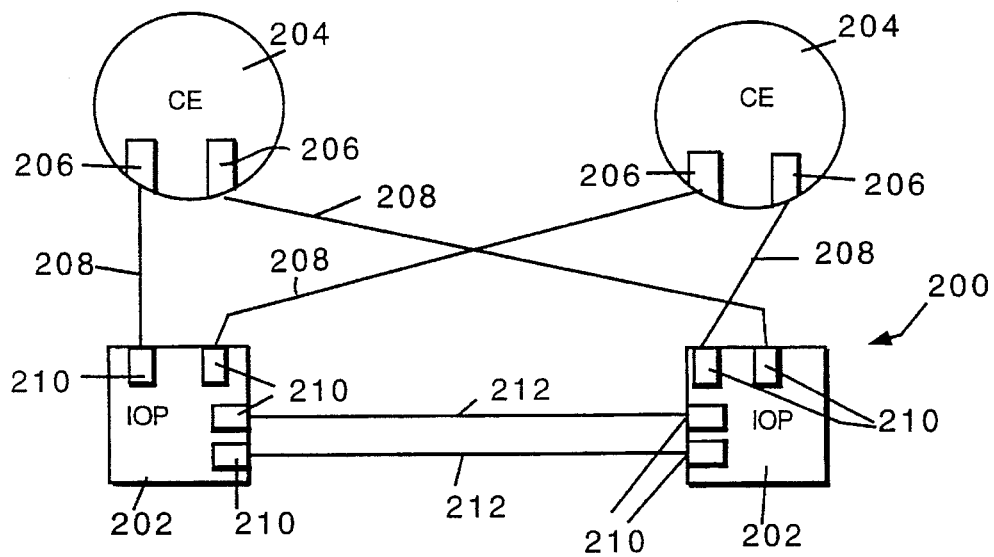
FIG. 6 is a block diagram of a fault resilient system.

In other embodiments of the invention, for example, referring to FIG. 6, a fault resilient system 200 includes two IOPs 202 and two CEs 204. Each CE 204 is connected, through an IPI card 206 and a cable 208, to an IPI card 210 of each IOP 202. IOPs 202 are redundantly connected to each other through IPI cards 210 and cables 212. Because every component of system 200 has a redundant backup component, system 200 is entirely fault resilient. In an alternative approach, cables 208 and 210 could be replaced by a pair of local area networks to which each IOP 202 and CE 204 would be connected. Indeed, local area networks can always be substituted for cable connections.

System 200 is operating system and application software independent in that it does not require modifications of the operating system or the application software to operate. Any single piece of hardware can be upgraded or repaired in system 200 with no service interruption. Therefore, by sequentially replacing each piece of hardware and allowing system 200 to resynchronize after each replacement, the hardware of system 200 can be replaced in its entirety without service interruption. Similarly, software on system 200 can be upgraded with minimal service interruption (that is, during the software upgrade, the application will become unavailable for an acceptable period of time such as two seconds). Also, disaster tolerance for purposes of availability can be obtained by placing each IOP/CE pair in a separate location and connecting the pairs through a communications link.

Figure 7:
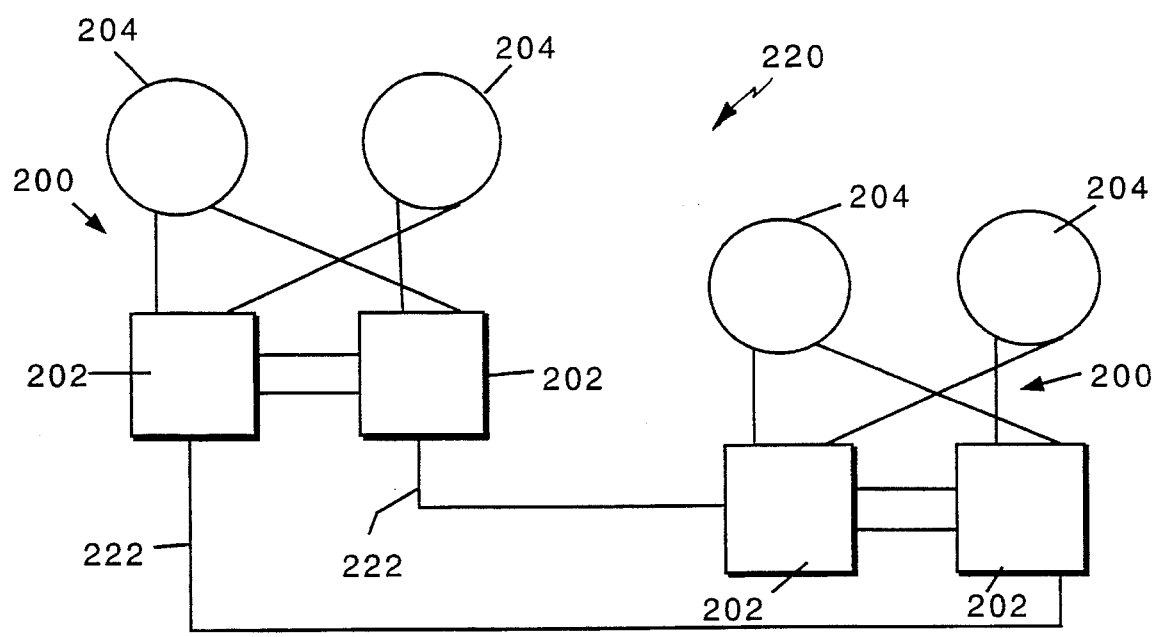
FIG. 7 is a block diagram of a distributed fault resilient system.

Referring to FIG. 7, a distributed, high performance, fault resilient system 220 includes two systems 200, the IOPs 202 of which are connected to each other, through IPI modules, by cables 222. System 220 uses distributed computing environment software to achieve high performance by running separate portions of an application on each system 200. System 220 is fault tolerant and offers the ability to perform both hardware and software upgrades without service interruption.

Figure 8:
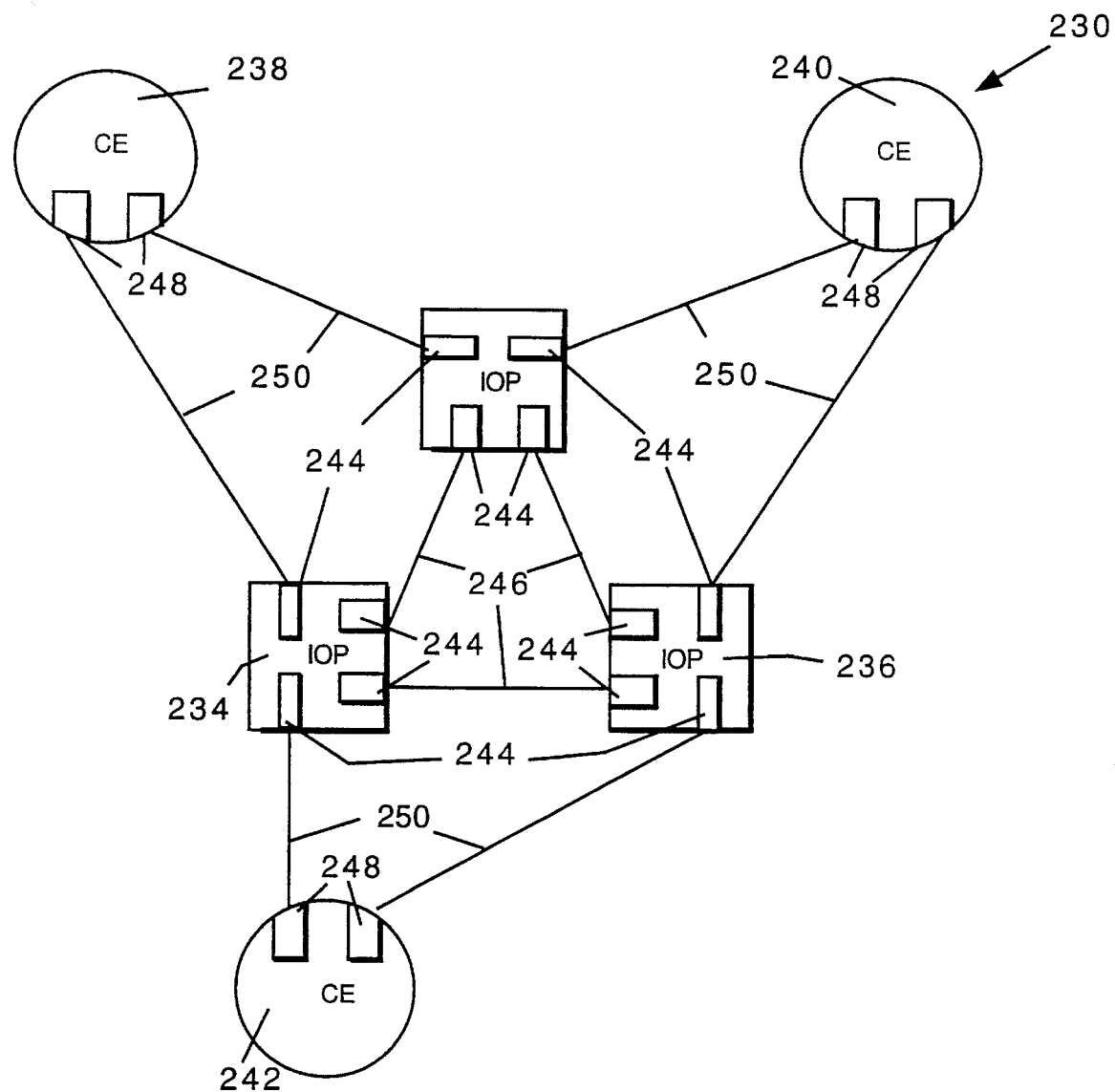
FIG. 8 is a block diagram of a fault tolerant system.

Referring to FIG. 8, a fault tolerant system 230 includes three IOPs (232, 234, and 236) and three CEs (238, 240, and 242). Through IPI modules 244 and cables 246, each IOP is connected to an IPI module 244 of each of the other IOPs. Through IPI modules 248 and cables 250, each CE is connected to an IPI module 244 of two of the IOPs, with CE 238 being connected to IOPs 232 and 234, CE 240 being connected to IOPs 232 and 236, and CE 242 being connected to IOPs 234 and 236. Like system 200, system 230 allows for hardware upgrades without service interruption and software upgrades with only minimal service interruption.

As can be seen from a comparison of FIGS. 7 and 8, the CEs and IOPs of systems 200 and 230 are identically configured. As a result, upgrading a fault resilient system 200 to a fault tolerant system 230 does not require any replacement of existing hardware and entails the simple procedure of adding an additional CE/IOP pair, connecting the cables, and making appropriate changes to the system software. This modularity is an important feature of the paired modular redundant architecture of the invention.

Because the components of system 230 are triply redundant, system 230 is more capable of identifying the source of a hardware fault than is system 10. Thus, while system 10 simply disables one or both of CEs 14 when an error is detected, system 230 offers a higher degree of fault diagnosis.

Figure 9:
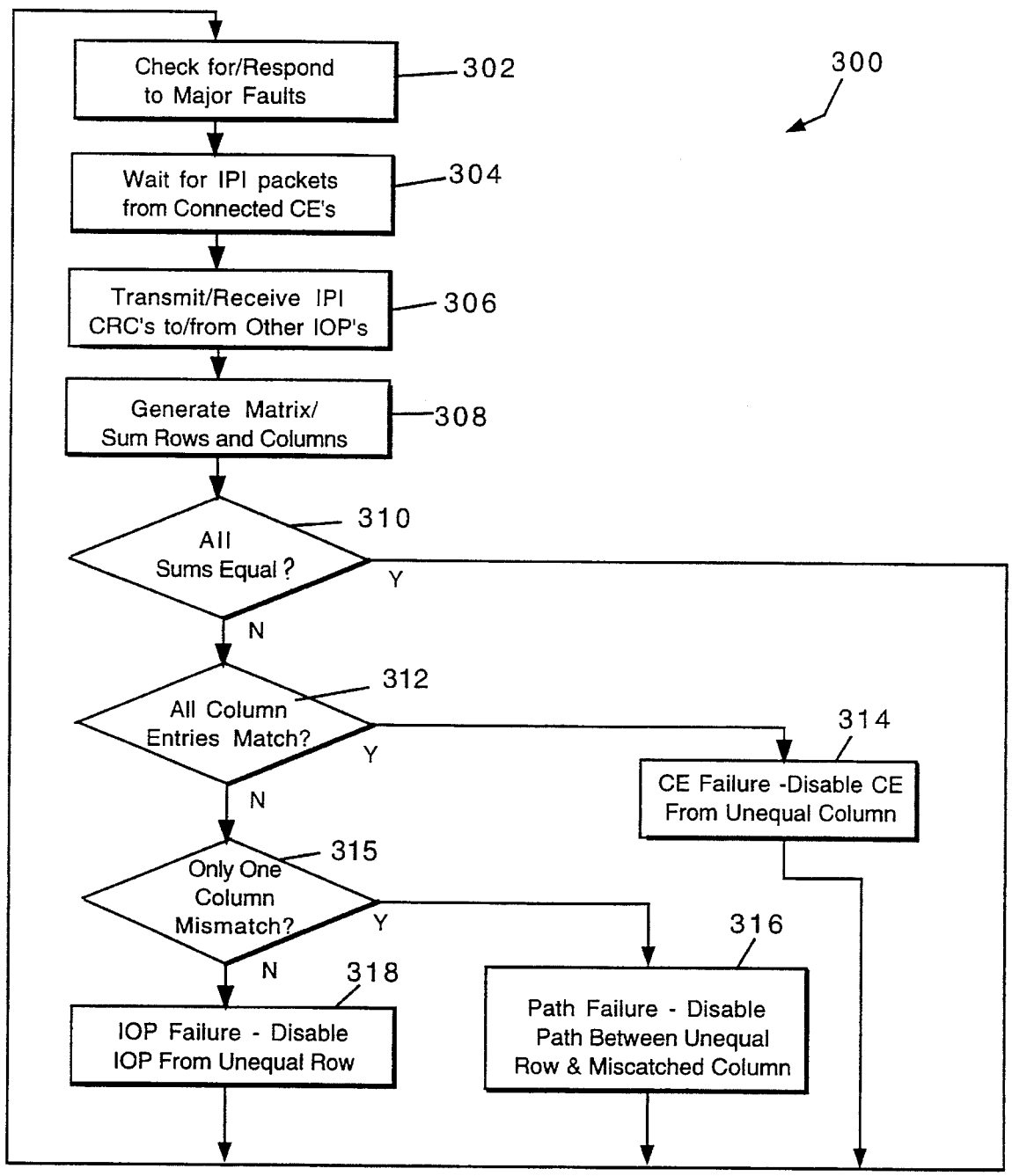
FIG. 9 is flowchart of a fault diagnosis procedure used by IOPs of the system of FIG. 8.

Referring to FIG. 9, each IOP (232, 234, 236) of system 230 performs fault diagnosis according to a procedure 300. Initially, each IOP (232, 234, 236) checks for major faults such as power loss, broken cables, and nonfunctional CEs or IOPs using well known techniques such as power sensing, cable sensing, and protocol timeouts (step 302). When such a fault is detected, each IOP disables the faulty device or, if necessary, the entire system.

After checking for major faults, each IOP waits to receive IPI packets (that is, quantum interrupts or I/O requests) from the two CEs to which the IOP is connected (step 304). Thus, for example, IOP 232 waits to receive IPI packets from CEs 238 and 240. After receiving IPI packets from both connected CEs, each IOP transmits the checksums ("CRCs") of those IPI packets to the other two IOPs and waits for receipt of CRCs from the other two IOPs (step 306).

After receiving the CRCs from the other two IOPs, each IOP generates a three by three matrix in which each column corresponds to a CE, each row corresponds to an IOP, and each entry is the CRC received from the column's CE by the row's IOP (step 308). Thus, for example, IOP 232 generates the following matrix:

|         | CE 238 | CE 240 | CE 242 |
|---------|--------|--------|--------|
| IOP 232 | CRC    | CRC    | X      |
| IOP 234 | CRC    | X      | CRC    |
| IOP 236 | X      | CRC    | CRC    |

After generating the matrix, IOP 232 sums the entries in each row and each column of the matrix. If the three row sums are equal and the three column sums are equal (step 310), then there is no fault and IOP 232 checks again for major faults (step 302).

If either the three rows sums or the three columns' sums are unequal (step 310), then IOP 232 compares the CRC entries in each of the columns of the matrix. If the two CRC entries in each column match (step 312), then IOP 232 diagnoses that a CE failure has occurred and disables the CE corresponding to the column for which the sum does not equal the sums of the other columns (step 314).

If the CRC entries in one or more of the matrix columns do not match (step 312), then IOP 232 determines how many of the columns include mismatched entries. If the matrix includes only one column with mismatched entries (step 315), then IOP 232 diagnoses that the path between the IOP corresponding to the matrix row sum that is unequal to the other matrix row sums and the CE corresponding to the column having mismatched entries has failed and disables that path (step 316). For purposes of the diagnosis, the path includes the IPI module 244 in the IOP, the IPI module 248 in the CE, and the cable 250.

If the matrix includes more than one column with mismatched entries (step 314), then IOP 232 confirms that one matrix row sum is unequal to the other matrix row sums, diagnoses an IOP failure, and disables the IOP corresponding to the matrix row sum that is unequal to the other matrix row sums (step 318).

If, after diagnosing and accounting for a CE failure (step 314), path failure (step 316), or IOP failure (step 318), IOP 232 determines that system 300 still includes sufficient non-faulty hardware to remain operational, IOP 232 checks again for major faults (step 302). Because system 230 is triply redundant, system 230 can continue to operate even after several components have failed. For example, to remain operating in an availability mode, system 230 only needs to have a single functional CE, a single functional IOP, and a functional path between the two.

Using procedure 300, each IOP (232, 234, 236) can correctly diagnose any single failure in a fully operational system 230 or in a system 230 in which one element (that is, a CE, an IOP, or a path) has previously been disabled. In a system 230 in which an element has been disabled, each IOP accounts for CRCs that are not received because of the disabled element by using values that appear to be correct in comparison to actually received CRCs.

Procedure 300 is not dependent on the particular arrangement of interconnections between the CEs and IOPs. To operate properly, procedure 300 only requires that the output of each CE be directly monitored by at least two IOPs. Thus, procedure 300 could be implemented in a system using any interconnect mechanism and does not require point to point connections between the CEs and IOPs. For example, the CEs and IOPs could be connected to at least two local area networks. In an alternative approach, instead of summing the CRC values in the rows and columns of the matrix, these values can be compared and those rows or columns in which the entries do not match can be marked with a match/mismatch indicator.

A simplified version of procedure 300 can be implemented for use in a system 200. In this procedure, each IOP 202 of system 200 generates a two by two matrix in which each column corresponds to a CE 204 and each row corresponds to a IOP 202:

|         | CE 204 | CE 204 |
|---------|--------|--------|
| IOP 202 | CRC    | CRC    |
| IOP 202 | CRC    | CRC    |

After generating the matrix, each IOP 202 attaches a mismatch indicator to each row or column in which the two entries are mismatched.

If there are no mismatch indicators, then system 200 is operating correctly.

If neither row and both columns have mismatch indicators, then an IOP 202 has faulted. Depending on the operating mode of system 200, an IOP 202 either disables another IOP 202 or shuts down system 200. The IOP 202 to be disabled is selected based on user supplied parameters similar to the two availability modes used in system 10.

If both rows and neither column have mismatch indicators, then a CE 204 has faulted. In this case, IOPs 202 respond by disabling a CE 204 if system 200 is operating in an availability mode or, if system 200 is operating in an integrity mode, shutting down system 200. If both rows and one column have mismatch indicators, then one of the paths between the IOPs 202 and the CE 204 corresponding to the mismatched column has failed. Depending on the operating mode of system 200, IOPs 202 either disable the CE 204 having the failed path or shut down system 200. If both rows and both column have mismatch indicators, then multiple faults exist and IOPs 202 shut down system 200.

If one row and both columns have mismatch indicators, then the IOP 202 corresponding to the mismatched row has faulted. Depending on the operating mode of system 200, the other IOP 202 either disables the faulty IOP 202 or shuts down system 200. If one row and one column have mismatch indicators, then the path between the IOP 202 corresponding to the mismatched row and the CE 204 corresponding to the mismatched column has failed. Depending on the operating mode of system 200, IOPs 202 either account for the failed path in future processing or shut down system 200.

Figure 10:
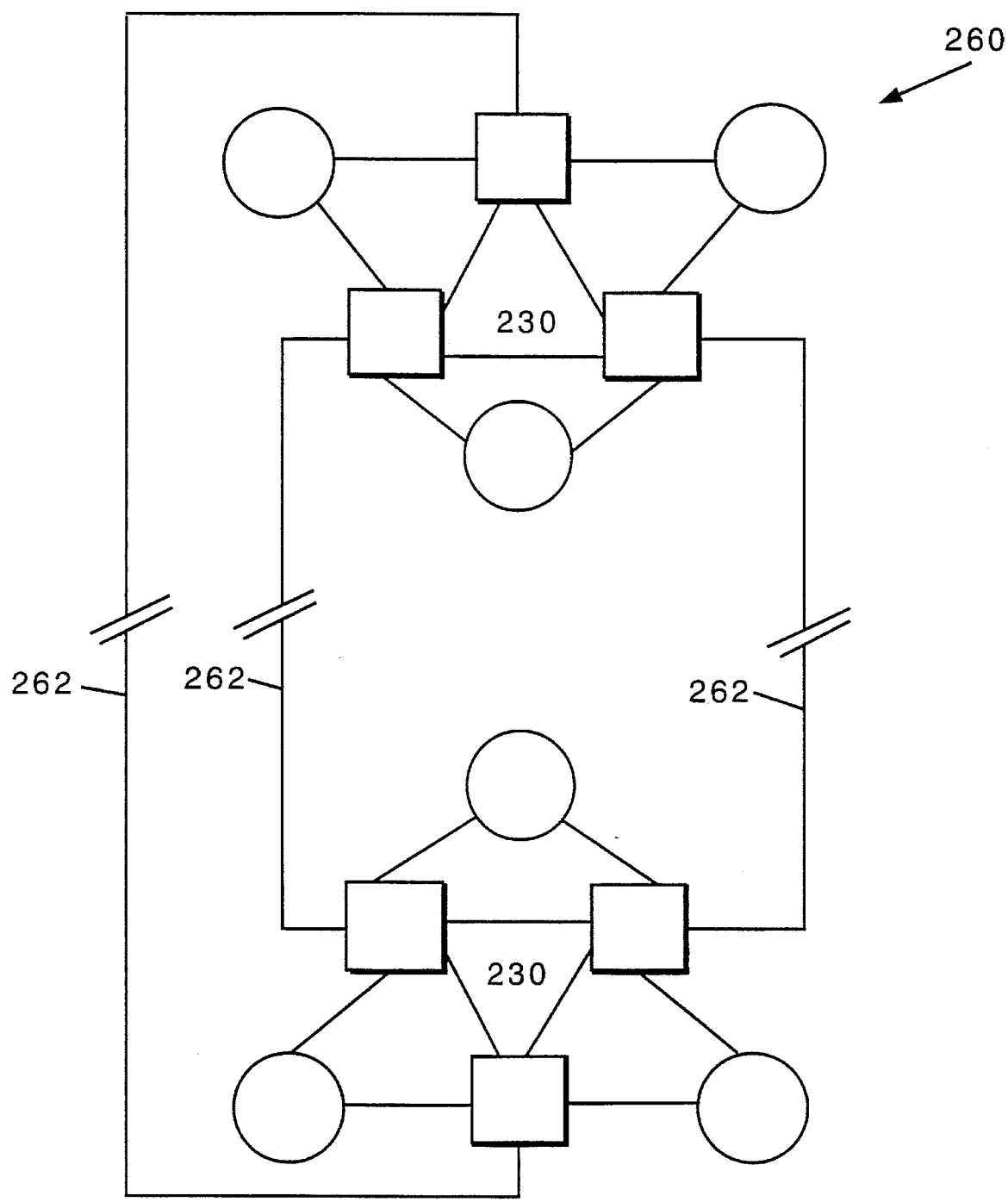
FIG. 10 is a block diagram of a disaster tolerant system.

Referring to FIG. 10, one embodiment of a disaster tolerant system 260 includes two fault tolerant systems 230 located in remote locations and connected by communications link 262, such as Ethernet or fiber, and operating in meta time lockstep with each other. To obtain meta time lockstep, all IPI packets are transmitted between fault tolerant systems 230. Like system 220, system 260 allows for hardware and software upgrades without service interruption.

As shown, the paired modular redundant architecture of the invention allows for varying levels of fault resilience and fault tolerance through use of CEs that operate asynchronously in real time and are controlled by IOPs to operate synchronously in meta time. This architecture is simple and cost-effective, and can be expanded or upgraded with minimal difficulty.

What is claimed is:

1. A method of eliminating effects of I/O race conditions caused by asynchrony between processors concurrently executing an application program or a first associated operating system and I/O devices, comprising the steps of:

executing the application program and the first associated operating system with said processors, executing an I/O processing program on a second associated operating system with an I/O processor for controlling said I/O devices, initiating with said processors memory requests from the application program or the first associated operating system, trapping, in each of said processors, all memory requests from the application program or the first associated operating system to all memory addresses associated with I/O devices, transmitting a trapped memory request from each of said processors to the I/O processor, waiting at said I/O processor for receipt of said trapped memory request transmitted from each of said processors, and performing said trapped memory request with the I/O processing program by said I/O processor, after receiving an identical request from each of said processors.

2. The method of claim 1, further comprising the steps of:

trapping, in each of said processors, all I/O requests from the application program or the first associated operating system, transmitting a trapped I/O request from each of said processors to the I/O processor, waiting at said I/O processor for the receipt of said trapped I/O request transmitted from each of said processors, and performing said trapped I/O request with the I/O processing program by said I/O processor, after receiving an identical request from each of said processors.

3. The method of claim 2, further comprising transmitting results of performing the trapped I/O request to said processors.

4. The method of claim 1, further comprising transmitting results of performing the trapped memory request to said processors.

5. The method of claim 1, wherein the first associated operating system is a different operating system than the second associated operating system.

* * * * *